United States Patent
Mizuno

(10) Patent No.: US 10,235,067 B2
(45) Date of Patent: Mar. 19, 2019

(54) TIME SHIFT RETRANSMISSION SYSTEMS

(71) Applicant: Yoshiro Mizuno, Tokyo (JP)

(72) Inventor: Yoshiro Mizuno, Tokyo (JP)

( * ) Notice: Subject to any disclaimer, the term of this patent is extended or adjusted under 35 U.S.C. 154(b) by 0 days.

(21) Appl. No.: 15/745,901

(22) PCT Filed: Feb. 22, 2016

(86) PCT No.: PCT/JP2016/054997
§ 371 (c)(1),
(2) Date: Jan. 18, 2018

(87) PCT Pub. No.: WO2017/017974
PCT Pub. Date: Feb. 2, 2017

(65) Prior Publication Data
US 2018/0210666 A1    Jul. 26, 2018

(30) Foreign Application Priority Data
Jul. 27, 2015   (JP) ................................. 2015-147413

(51) Int. Cl.
*G06F 3/06*     (2006.01)
*H04L 1/08*     (2006.01)
(Continued)

(52) U.S. Cl.
CPC .......... *G06F 3/0619* (2013.01); *G06F 3/0659* (2013.01); *G06F 11/1443* (2013.01);
(Continued)

(58) Field of Classification Search
CPC .... G06F 3/0619; G06F 3/0655; G06F 3/0659; G06F 11/1443; G06F 11/1458;
(Continued)

(56) References Cited

U.S. PATENT DOCUMENTS 4,968,978 A * 11/1990 Stolarczyk ............. E21C 35/24
                                                    175/40
2009/0229455 A1* 9/2009 Eichner ................. F04B 49/065
                                                    91/1
(Continued)

FOREIGN PATENT DOCUMENTS

JP      2005-117578 A     4/2005
JP      2009-278391 A     11/2009
(Continued)

*Primary Examiner* — Thomas J Cleary
(74) *Attorney, Agent, or Firm* — Enshan Hong; VLP Law Group LLP

(57) ABSTRACT

Provided is a time-shift retransmission system which is a system that manages communication of a remote sensor connected to a communication line, the time-shift retransmission system including: a) temporary storage means in which measurement values measured according to a sampling schedule by the remote sensor is temporarily stored at a predetermined interval; and b) retransmission means that retransmits the measurement values according to a retransmission schedule with plural different cycles, in which a delay time from the measurement to the retransmission differs according to the cycle, and the delay time is set in a range in which the data amount of a measurement value group that is temporarily stored within the delay time falls within the storage capacity of the temporary storage means.

2 Claims, 7 Drawing Sheets

(51) Int. Cl.
    *G06F 11/14*     (2006.01)
    *H04L 29/08*     (2006.01)

(52) U.S. Cl.
    CPC ............... *H04L 1/08* (2013.01); *H04L 67/12* (2013.01); *Y02D 50/30* (2018.01)

(58) Field of Classification Search
    CPC .. G06F 11/1461; G06F 11/3089; G06F 13/42; H04L 1/08; H04L 1/18; H04L 1/1816; H04L 1/1874; H04L 67/12; Y02D 50/30
    See application file for complete search history.

(56) References Cited

U.S. PATENT DOCUMENTS

| | | | |
|---|---|---|---|
| 2009/0287322 A1 | 11/2009 | Endo et al. | |
| 2014/0176324 A1* | 6/2014 | Kim | B60C 23/0416 340/442 |
| 2014/0293993 A1* | 10/2014 | Ryhorchuk | H04L 67/12 370/350 |
| 2015/0054654 A1* | 2/2015 | Albinali | G08B 21/02 340/870.01 |
| 2016/0340856 A1* | 11/2016 | Conner | E02D 31/10 |
| 2018/0046215 A1* | 2/2018 | Gosieski, Jr. | B33Y 50/02 |

FOREIGN PATENT DOCUMENTS

| | | |
|---|---|---|
| JP | 2010-282269 A | 12/2010 |
| JP | 2011-151616 A | 8/2011 |

\* cited by examiner

FIG. 4

| MEASUREMENT TIME | MEASUREMENT VALUE |
|---|---|
| t=T−1m | A(T−1m) |
| t=T−2m | A(T−2m) |
| ⋮ | ⋮ |
| t=T−60m | A(T−60m) |

FIG. 5

| MEASUREMENT TIME | MEASUREMENT VALUE |
|---|---|
| t=T−10m | B(T−10m) |
| t=T−20m | B(T−20m) |
| ⋮ | ⋮ |
| t=T−1440m | B(T−1440m) |

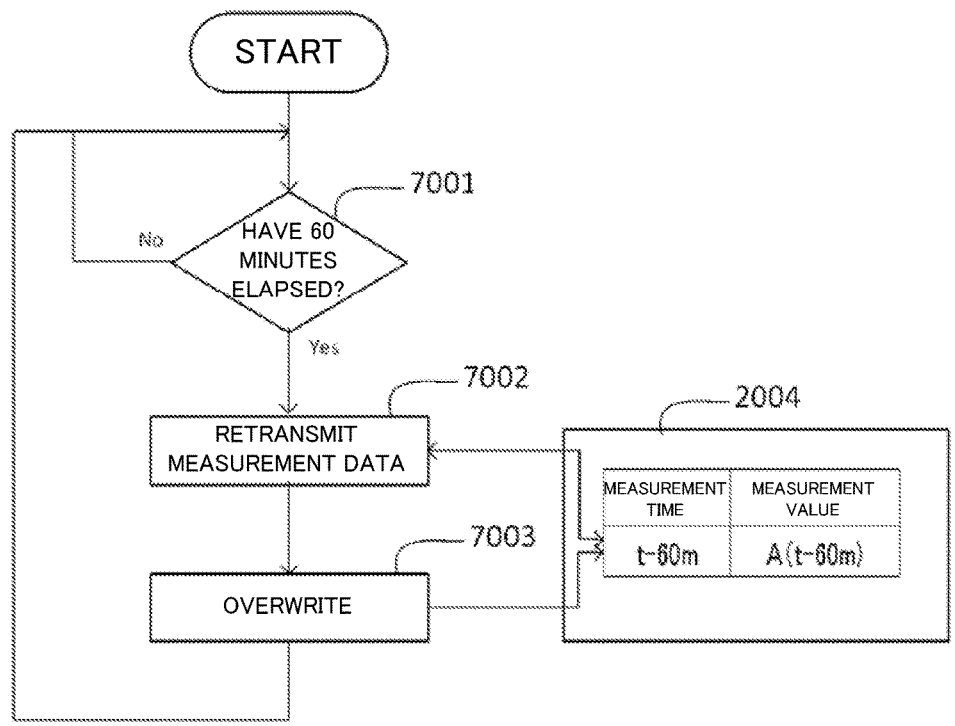

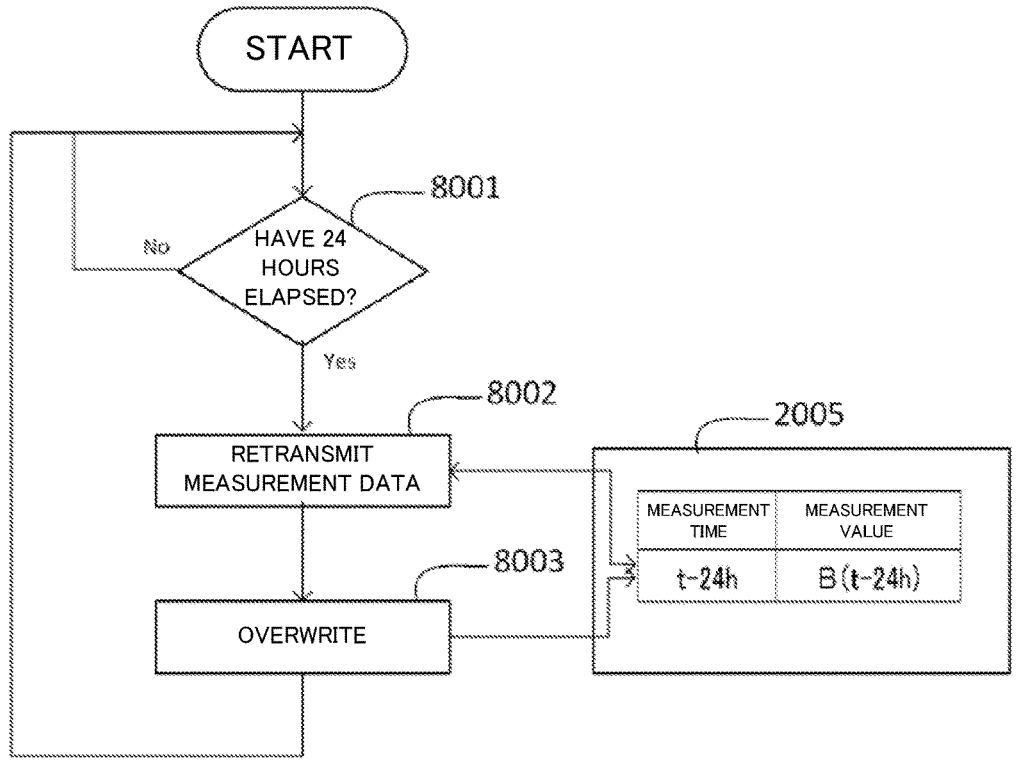
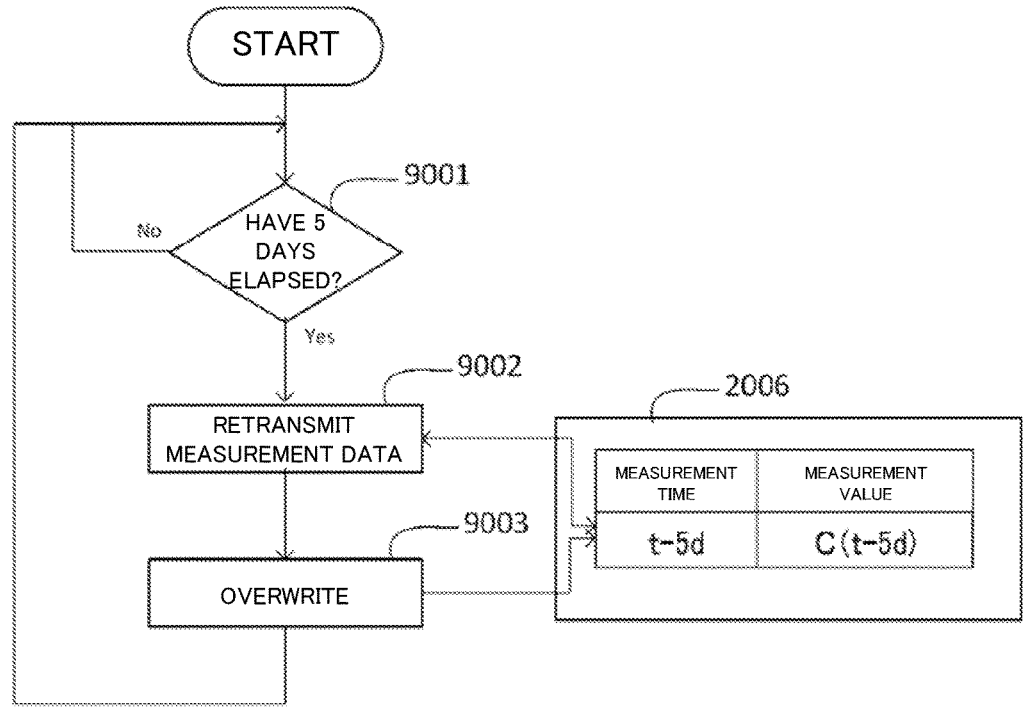

FIG. 10

| | TIME | REAL-TIME TRANSMISSION DATA | FIRST TRANSMISSION DATA | SECOND TRANSMISSION DATA | THIRD TRANSMISSION DATA |
|---|---|---|---|---|---|
| | | 10001 | 10002 | 10003 | 10004 | 10005 |
| 10006 | t=T | Dt | A(t-60m) | B(t-24h) | C(t-5d) |
| 10007 | t=T+1m | Dt | A(t-60m) | | |
| 10008 | t=T+2m | Dt | A(t-60m) | | |
| | ... | ... | ... | | |
| 10009 | t=T+10m | Dt | A(t-60m) | B(t-24h) | |
| | ... | ... | ... | ... | |
| 10010 | t=T+20m | Dt | A(t-60m) | B(t-24h) | |
| | ... | ... | ... | ... | |
| 10011 | t=T+1h | Dt | A(t-60m)=A(T) | B(t-24h) | C(t-5d) |
| | ... | ... | ... | ... | ... |
| 10012 | t=T+2h | Dt | A(t-60m) | B(t-24h) | C(t-5d) |
| | ... | ... | ... | ... | ... |
| 10013 | t=T+1d | Dt | A(t-60m) | B(t-24h)=B(T) | C(t-5d) |
| | ... | ... | ... | ... | ... |
| 10014 | t=T+2d | Dt | A(t-60m) | B(t-24h) | C(t-5d) |
| | ... | ... | ... | ... | ... |
| 10015 | t=T+5d | Dt | A(t-60m) | B(t-24h) | C(t-5d)=C(T) |

TIME SHIFT RETRANSMISSION SYSTEMS

PRIORITY CLAIM

This is a U.S. national stage of application No. PCT/JP2016/054997, filed on Feb. 22, 2016. Priority is claimed on the following applications: Country: Japan, Application No.: 2015-147413, Filed: Jul. 27, 2015, the content of which is incorporated here by reference.

TECHNICAL FIELD

The present disclosure relates to systems for retransmitting measurement values from remote sensors, and relates particularly to a time-shift retransmission system that retransmits a measurement value measured according to a sampling schedule at regular delay time intervals.

BACKGROUND ART

In conventional retransmission systems for remote sensors, storage apparatuses for backup have been disposed in remote sensors or local servers placed in local locations (measurement locations) to be able to obtain missing data at the time of failures such as failure of communication lines. The conventional retransmission systems have adopted methods of transmitting retransmission requests from management servers via communication lines and retransmitting missing data.

In the conventional retransmission systems, however, it has been necessary to allow the storage apparatuses for backup to be nonvolatile in order to allow the operations of the retransmission systems after failures to be durable. Further, it has been also necessary to stabilize the communication operation of transmitting requests for retransmission from management servers and receiving missing data.

CITATION LIST

Patent Literature

Patent Literature 1 describes a retransmission system for allowing a field instrument such as an actuator to reliably execute expected processing on the basis of measurement data transmitted by a field instrument such as a measurement instrument in an instrumentation control system using a fieldbus communication method.

In the retransmission system, the second field instrument (actuator) requests retransmission of data when data for executing predetermined processing is not normal data, in the instrumentation control system (field network system) using the fieldbus communication method. Then, the first field instrument (measurement instrument) retransmits data in response to the data retransmission request.

Accordingly, expected processing based on normal data transmitted by the first field instrument is reliably carried out in the second field instrument, and therefore, malfunction can be effectively prevented from occurring by carrying out predetermined processing on the basis of past data.

However, the first field instrument comprises:

a transmission buffer in which data to be transmitted to the second field instrument is stored; and an inquiry processor that retransmits the data stored in the transmission buffer in response to a data retransmission request from the second field instrument, wherein the second field instrument comprises:

a receive buffer in which data transmitted from the first field instrument is stored; and a confirmer that determines whether or not the data stored in the receive buffer is normal data and that requests the first field instrument to retransmit data when the data is not the normal data, and an operation based on complicated logic, in which predetermined processing is carried out based on data determined to be normal data by the confirmer is required.

Patent Literature 1: Unexamined Japanese Patent Application Kokai Publication No. 2009-278391

SUMMARY OF INVENTION

Technical Problem

A problem to be solved by the present disclosure is to provide a retransmission system that automatically transmits old data, thereby eliminating the need for a special retransmission request or logic, reducing a transmission capacity, and working stably. A problem to be solved by the present disclosure is to also provide a retransmission system that automatically retransmits old data together with new data, thereby reducing a load and consumed power needed for communications, and working stably.

Solution to Problem

In a first aspect of the present disclosure, there is provided a time-shift retransmission system that is a system that manages communication of a remote sensor, the time-shift retransmission system including:

a) temporary storage means in which measurement values measured according to a sampling schedule by the remote sensor is temporarily stored at a predetermined interval; and b) retransmission means that retransmits the measurement values according to a retransmission schedule with plural different cycles, wherein a delay time from the measurement to the retransmission differs according to the cycle; and the delay time is set in a range in which the data amount of a measurement value group that is temporarily stored within the delay time falls within the storage capacity of the temporary storage means.

The retransmission may be executed by communication identical to transmission of measurement values measured in real time by the remote sensor.

BRIEF DESCRIPTION OF DRAWINGS

FIG. 4 is a block diagram indicating measurement data temporarily stored in a first buffer memory at a time T;

FIG. 5 is a block diagram indicating measurement data temporarily stored in a second buffer memory at a time T;

FIG. 6 is a block diagram indicating measurement data temporarily stored in a third buffer memory at a time T;

FIG. 7 is a flowchart of retransmission operation according to a first retransmission schedule;

FIG. 8 is a flowchart of retransmission operation according to a second retransmission schedule;

FIG. 9 is a flowchart of retransmission operation according to a third retransmission schedule; and FIG. 10 is a time table representing relationships between sampling times and transmitted real-time measurement and retransmission measurement values.

DESCRIPTION OF EMBODIMENTS

An embodiment for carrying out the present disclosure will be described below with reference to the drawings.

The operations or functions of a system described herein are achieved in cooperation with various implemented devices by allowing a processor with a predetermined circuit to execute control programs such as firmware incorporated in advance. Further, the programs are recorded on a non-transitory computer-readable recording medium, read from the non-transitory recording medium by the processor, and executed by user's manipulation or by reception of a signal from a device included in the system.

Embodiment 1

Figure 1:
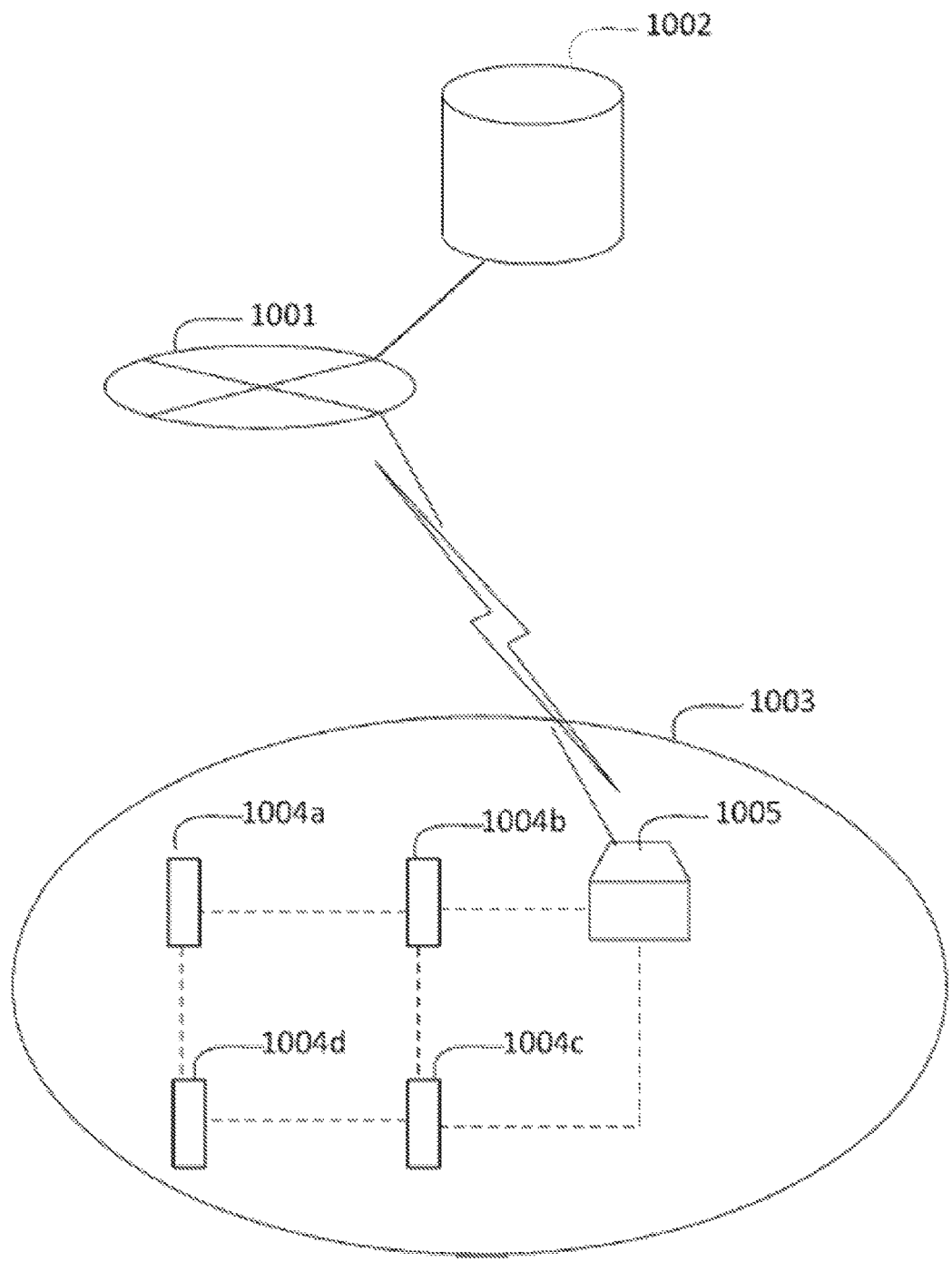
FIG. 1 is an overall view of a retransmission system.

FIG. 1 is an overall view illustrating a retransmission system of Embodiment 1. The configuration of the system includes: a management server 1002 connected to a communication line 1001; remote sensors 1004a to 1004d arranged in a measurement area 1003; and a local server 1005. The local server executes communication connections between the remote sensors and the communication line, and a management operation in a local location. Herein, the four remote sensors in the measurement area are described. However, the number of remote sensors managed by the retransmission system of the present disclosure is not limited thereto, and can be changed as appropriate according to an applied target for measurement.

Herein, a configuration including a 3G/LTE wireless communication circuit is adopted in the communication line 1001. However, communication lines which can be adopted in the present disclosure are not limited thereto.

(Management Server) The management server 1002 receives a real-time measurement value transmitted in real time at a measurement time, and a retransmitted retransmission measurement value from the remote sensors 1004a to 1004d. The management server associates a measurement value with a measurement time, and the measurement value is stored in the management server. The management server manages the measurement value so that the measurement value can be called as the need for compensation for a real-time measurement value missed by communication failure, or the like. In such a case, the remote sensors and the management server share a protocol for a measurement time. The sharing causes time synchronization for a measurement time between the remote sensors and the management server, thereby eliminating the need for the time stamp of a measurement time in retransmission. Due to such a mechanism for time synchronization, the load factor of transmission can be reduced, and a consumed power required for communication can also be saved in the system of the present disclosure.

Figure 2:
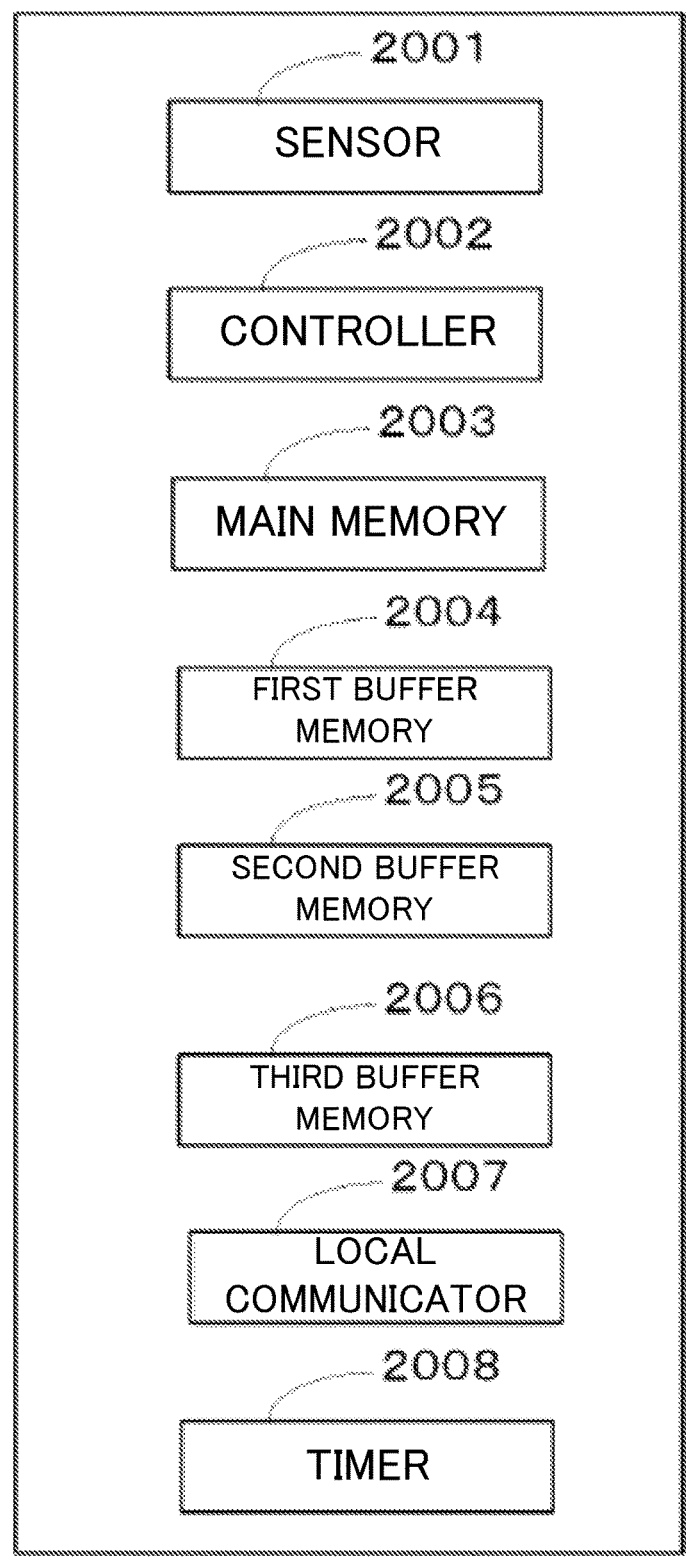
FIG. 2 is a block diagram illustrating the functional configuration of remote sensors.

(Remote Sensors) FIG. 2 is a block diagram illustrating the functional configuration of the remote sensors. Herein, it is assumed that the same configuration is adopted in the four remote sensors denoted by the reference characters 1004a to 1004d. Such a remote sensor includes functional configuration blocks including: a sensor 2001 that measures the temperature of the measurement area 1003; a controller 2002 that controls the measurement operation, measurement value storage operation, and data sending operation of the sensor; a main memory 2003 in which a sampling schedule, retransmission schedules, and a control program are stored; a first buffer memory 2004 that associates a measurement value with a measurement time to temporarily store the measurement value and the measurement time at an interval of one minute for the first retransmission schedule; a second buffer memory 2005 that associates a measurement value with a measurement time to temporarily store the measurement value and the measurement time at an interval of ten minutes for the second retransmission schedule; a third buffer memory 2006 that associates a measurement value with a measurement time to temporarily store the measurement value and the measurement time at an interval of one hour for the third retransmission schedule; a local communicator 2007 that carries out a communication in a sensor network formed in the measurement area; and a timer 2008.

Herein, a temperature sensor is adopted as the sensor. However, sensors that can be adopted in the present disclosure are not limited thereto. A temperature-humidity sensor (sensor in which a temperature sensor and a humidity sensor are integrated), a humidity sensor, a vibration sensor, an acceleration sensor, or the like can be adopted as appropriate according to the properties of a target for measurement.

(Local Server) The local server 1005 carries out local communications with the remote sensors 1004a to 1004d included in the sensor network, further connects the sensor network and the communication line 1001 to each other through wide area communications, and establishes communication connection with the management server 1002 connected to the communication line.

(Sampling Schedule and Retransmission Schedules) The sampling schedule is set so that the remote sensors carry out measurements at sampling times at intervals of one minute and transmit real-time measurement values. The first retransmission schedule is set so that the remote sensors acquire the real-time measurement values generated every minute at intervals of one minute on an as-is basis (hereinafter, acquired times set at intervals of one minute are referred to as "first buffer times"), the real-time measurement values are temporarily stored in the first buffer memory 2004, and the temporarily stored measurement values are retransmitted at sampling times occurring one hour after the real-time sampling times (retransmission times after a delay time of one hour). The second retransmission schedule is set to have a delay time of 24 hours. Herein, the second retransmission schedule is set so that the remote sensors acquire the real-time measurement values at intervals of ten minutes (hereinafter, acquisition times set at intervals of ten minutes are referred to as "second buffer times"), the real-time measurement values are temporarily stored in the second buffer memory 2005, and the measurement values temporarily stored 24 hours before are retransmitted at sampling times occurring 24 hours after the real-time sampling times (retransmission times after a delay time of 24 hours). The third retransmission schedule is set to have a delay time of five days. Herein, the third retransmission schedule is set so that the remote sensors acquire the real-time measurement values at intervals of one hour (hereinafter, acquisition times set at intervals of one hour are referred to as "third buffer time"), the real-time measurement values are temporarily stored in the third buffer memory 2006, and the measurement values temporarily stored five days before are retransmitted at sampling times occurring five days after the real-time sampling times (retransmission times after a delay time of 5 days). In the above, a method of allowing communications for transmitting real-time measurement values to include past measurement values according to retransmission, thereby reducing the number of the communications, is adopted. However, the communications may be separate from the transmissions of the real-time measurement values set in the sampling schedule.

Figure 3:
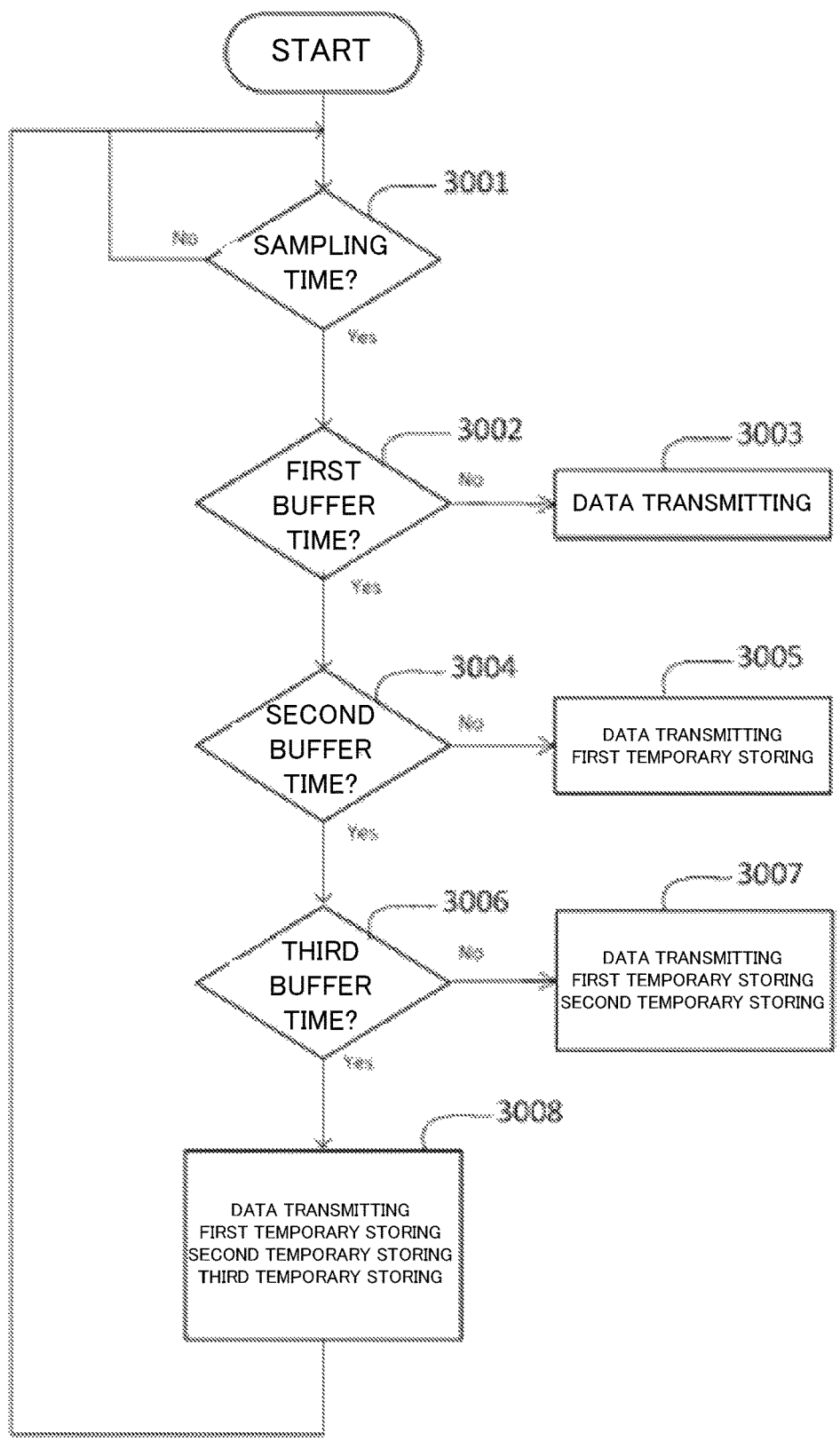
FIG. 3 is a flowchart illustrating the operations of sampling and temporary storage.

FIG. 3 is a flowchart illustrating the operations of sampling and temporary storage. In sampling time determination step 3001, the controller 2002 in each remote sensor acquires a current time from the timer 2008 and executes a determination whether or not the current time is a set sampling time. In such a case, when a determination that the current time is not the sampling time (No) is made, the system operation returns to the start and re-determines a current time. When a determination that the current time is the sampling time (Yes) is made, the system operation goes to first buffer time determination step 3002. In this step, the controller 2002 executes a determination whether or not the current time acquired from the timer 2008 is the set first buffer time. When a determination that the current time is not the first buffer time (No) in the determination, the system operation goes to data communication step 3003, and the remote sensors transmit the measurement value measured by the remote sensors at this time to the management server 1002 via the local server 1005. When a determination that the current time is the first buffer time (Yes) is made, the system operation goes to second buffer time determination step 3004. In this step, the controller 2002 executes a determination whether or not the current time acquired from the timer 2008 is the set second buffer time.

When a determination that the current time is not the second buffer time (No) is made in the determination whether or not the current time is the second buffer time, the system operation goes to step 3005. In this step, the remote sensors transmit the measurement value to the management server 1002 and allow the measurement value measured by the remote sensors at this time to be temporarily stored in the first buffer memory 2004. When a determination that the current time is the second buffer time (Yes) is made, the system operation goes to third buffer time determination step 3006. In this step, the controller 2002 executes a determination whether or not the current time acquired from the timer 2008 is the set third buffer time.

When a determination that the current time is not the third buffer time (No) is made in the determination whether or not the current time is the third buffer time, the system operation goes to step 3007. In this step, the remote sensors transmit the measurement value to the management server 1002 and allow the measurement value measured by the remote sensors at this time to be temporarily stored in the first buffer memory 2004 and the second buffer memory 2005. When a determination that the current time is the third buffer time (Yes) is made, the system operation goes to step 3008. In this step, the remote sensors transmit the measurement value to the management server 1002 and allow the measurement value measured by the remote sensors at this time to be temporarily stored in the first buffer memory 2004, the second buffer memory 2005, and the third buffer memory 2006.

In the present embodiment, the three different retransmission schedules are adopted. However, the kinds of retransmission schedules that can be adopted in present disclosure are not limited thereto, and can be changed as appropriate according to the capacity of a buffer memory, a sampling interval in a sampling schedule, or the amount of data acquired in one measurement.

FIG. 4 is a block diagram indicating measurement data temporarily stored in the first buffer memory 2004 at a time T. The structure of the data includes a measurement time 4001 and a measurement value 4002. At the time T, 60 pieces of data from measurement data 4003 at a time T−1 m (one minute before the time T) to measurement data 4004 at a time T−60 m (one hour before the time T) at intervals of one minute are stored. A configuration in which measurement data corresponding to one hour is temporarily stored at intervals of one minute for retransmission at a delay time interval of one hour is adopted in the first buffer memory. However, the configuration can be changed as appropriate according to a retransmission schedule, as described above.

FIG. 5 is a block diagram indicating measurement data temporarily stored in the second buffer memory 2005 at a time T. The structure of the data includes a measurement time 5001 and a measurement value 5002. At the time T, 144 pieces of data from measurement data 5003 at a time T−10 m (ten minutes before the time T) to measurement data 5004 at a time T−60 m (1440 minutes, that is, 24 hours before the time T) at intervals of ten minutes are stored. A configuration in which measurement data corresponding to 24 hours is temporarily stored at intervals of ten minutes for retransmission at delay time intervals of 24 hours is adopted in the second buffer memory. However, the configuration can be changed as appropriate according to a retransmission schedule, as described above.

FIG. 6 is a block diagram indicating measurement data temporarily stored in the third buffer memory 2006 at a time T. The structure of the data includes a measurement time 6001 and a measurement value 6002. At the time T, 120 pieces of data from measurement data 6003 at a time T−1 h (one hour before the time T) to measurement data 6004 at a time T−120 h (120 hours, that is, five days before the time T) at intervals of one hour are stored. A configuration in which measurement data corresponding to five days is temporarily stored at intervals of one hour for retransmission at delay time intervals of five days is adopted in the third buffer memory. However, the configuration can be changed as appropriate according to a retransmission schedule, as described above.

FIG. 7 is a flowchart of retransmission operation according to the first retransmission schedule. Herein, with regard to data according to the retransmission in the first retransmission schedule, all of measurement values acquired at intervals of one minute according to the sampling schedule are stored in the first buffer memory. In step 7001, the controller 2002 in each remote sensor acquires a current time t from the timer 2008, and executes a determination whether a set delay time of 60 minutes has elapsed with regard to the temporarily stored measurement times for the measurement values. In this step, when it is determined that the delay time has not elapsed (No), the operation of the system returns to the start, and a lapse of the delay time is re-determined. When it is determined that the delay time has elapsed (Yes), the operation of the system goes to measurement data retransmission step 7002. A past measurement value A (t−60 m) acquired 60 minutes before (t−60 m) is extracted and retransmitted from the first buffer memory 2004 by the controller 2002. Then, measurement data including the measurement value A (t−60 m) at the measurement time (t−60 m) is overwritten with measurement data including a measurement value A (t) at the current time t by the controller 2002 in overwriting step 7003.

FIG. 8 is a flowchart of retransmission operation according to the second retransmission schedule. Herein, with regard to data according to the retransmission in the second retransmission schedule, measurement values extracted at intervals of ten minutes from measurement data acquired according to the sampling schedule are stored in the second buffer memory. In step 8001, the controller 2002 in each remote sensor acquires a current time t from the timer 2008, and executes a determination whether a set delay time of 24 hours has elapsed with regard to the temporarily stored measurement times for the measurement values. In this step, when it is determined that the delay time has not elapsed (No), the operation of the system returns to the start, and a lapse of the delay time is re-determined. When it is determined that the delay time has elapsed (Yes), the operation of the system goes to measurement data retransmission step 8002. A past measurement value B (t−24 h) acquired 24 hours before (t−24 h) is extracted and retransmitted from the second buffer memory 2005 by the controller 2002. Then, measurement data including the measurement value B (t−24 h) at the measurement time (t−24 h) is overwritten with measurement data including a measurement value B (t) at the current time t by the controller 2002 in overwriting step 8003.

FIG. 9 is a flowchart of retransmission operation according to the third retransmission schedule. Herein, with regard to data according to the retransmission in the third retransmission schedule, measurement data extracted at intervals of one hour from measurement values acquired according to the sampling schedule is stored in the third buffer memory. In step 9001, the controller 2002 in each remote sensor acquires a current time t from the timer 2008, and executes a determination whether a set delay time of 5 days has elapsed with regard to the temporarily stored measurement times for the measurement values. In this step, when it is determined that the delay time has not elapsed (No), the operation of the system returns to the start, and a lapse of the delay time is re-determined. When it is determined that the delay time has elapsed (Yes), the operation of the system goes to measurement data retransmission step 9002. A past measurement value C (t−5 d) acquired 5 days before (t−5 d) is extracted and retransmitted from the third buffer memory 2005 by the controller 2002. Then, measurement data including the measurement value C (t−5 d) at the measurement time (t−5 d) is overwritten with measurement data including a measurement value C (t) at the current time t by the controller 2002 in overwriting step 9003.

FIG. 10 is a time table representing relationships between sampling times and real-time measurement and retransmission measurement values transmitted by the remote sensors. Items listed in the time table are a sampling time 10001, real-time transmission data 10002, first retransmission data 10003, second retransmission data 10004, and third retransmission data 10005. Reference character 10006 denotes values of the real-time transmission data 10002, the first retransmission data 10003, the second retransmission data 10004, and the third retransmission data 10005 at a time (t=T). Reference character 10007 denotes such values as described above at a time (t=T+1 m). At this time, only real-time transmission data Dt and first retransmission data A (t−60 m) are transmitted, and the other items of data are not transmitted. Reference character 10008 denotes such values as described above at a time (t=T+2 m). At this time, only the real-time transmission data and the first retransmission data are transmitted, and the other items of data are not transmitted. At a time (t=T+10 m) denoted by reference character 10009, real-time transmission data Dt, first retransmission data A (t−60 m), and second retransmission data B (t−24 h) are transmitted. At a time (t=T+20 m) denoted by reference character 10010, real-time transmission data Dt, first retransmission data A (t−60 m), and second retransmission data B (t−24 h) are transmitted. At a time (t=T+1 h) denoted by reference character 10011, real-time transmission data Dt, first retransmission data A (t−60 m)=A (T), second retransmission data B (t−24 h), and third retransmission data C (t−5 d) are transmitted. At a time (t=T+2 h) denoted by reference character 10012, real-time transmission data Dt, first retransmission data A (t−60 m), second retransmission data B (t−24 h), and third retransmission data C (t−5 d) are transmitted. At a time (t=T+1 d) denoted by reference character 10013, real-time transmission data Dt, first retransmission data A (t−60 m), second retransmission data B (t−24 h)=B (T), and third retransmission data C (t−5 d) are transmitted. At a time (t=T+2 d) denoted by reference character 10014, real-time transmission data Dt, first retransmission data A (t−60 m), second retransmission data B (t−24 h), and third retransmission data C (t−5 d) are transmitted. At a time (t=T+5 d) denoted by reference character 10015, real-time transmission data Dt, first retransmission data A (t−60 m), second retransmission data B (t−1 d), and third retransmission data C (t−5 d)=C (T) are transmitted.

Even when real-time transmission data is missed due to failure, adoption of such a transmission and retransmission method enables the real-time transmission data to be supplemented with retransmission data automatically transmitted after a predetermined delay time. In other words, measurement data having a measurement resolution of a one-minute interval can be acquired by first retransmission at 60 minutes later when real-time transmission data is missed due to failure for 60 minutes or less. When transmission data is missed due to failure for more than 60 minutes and 24 hours or less, measurement data having a measurement resolution of a ten-minute interval can be acquired by second retransmission at 24 hours later. In the case of failure for more than 24 hours, measurement data having a measurement resolution of a one-hour interval can be acquire by third retransmission at five days later as long as the failure continues for five days or less. In such a manner, measurement data having an appropriate measurement resolution can be re-acquired according to normal system operation depending on a length of time for which failure continues. In other words, a buffer memory having a limited storage capacity enables measurement data having a high measurement resolution to be re-acquired for short-time failure, while data missed for a longer period is enabled to be re-acquired by retransmitting measurement data having a low measurement resolution for long-time failure.

Example embodiments disclosed herein are to be regarded in an illustrative rather than a restrictive sense in all respects. The scope of the invention is defined only by the included claims rather than the foregoing discussion, and intended to encompass all changes within the meaning and scope of equivalents to which such claims are entitled.

The present application claims priority based on Japanese Patent Application No. 2015-147413, and the entire content of basic application is incorporated herein.

INDUSTRIAL APPLICABILITY

The present disclosure can be applied to industries in which remote sensors are used in order to monitor various environments, for example, various industries such as the transportation industry, the food industry, the pharmaceutical industry, the space industry for artificial satellites, planetary exploration, and the like, and the nature observation industry for animal tracking.

REFERENCE SIGNS LIST

1001 Communication line
1002 Management server

1003 Measurement area
1004a Remote sensor
1005 Local server

The invention claimed is:
1. A time-shift retransmission system that is a system that manages communication of a remote sensor, the time-shift retransmission system comprising:
   a) temporary storage in which measurement values measured according to a sampling schedule by the remote sensor is temporarily stored at a predetermined interval; and
   b) retransmitter configured to retransmit the measurement values according to a first retransmission schedule and retransmit the measurement values according to a second retransmission schedule with a cycle different from that of the first retransmission schedule,
   wherein a delay time from the measurement to the retransmission in the first retransmission schedule is shorter than a delay time from the measurement to the retransmission in the second retransmission schedule;
   the delay time in each of the first retransmission schedule and the second retransmission schedule is set in a range in which a data amount of a measurement value group that is temporarily stored within the delay time falls within a storage capacity of the temporary storage; and
   a sampling interval at which first measurement values of the measurement values are measured is shorter than a sampling interval at which second measurement values of the measurement values are measured, the first measurement values being temporarily stored in the temporary storage for retransmitting the first measurement values according to the first retransmission schedule, and the second measurement values being temporarily stored in the temporary storage for retransmitting the second measurement values according to the second retransmission schedule.

2. The time-shift retransmission system according to claim 1, wherein the retransmission is executed by communication identical to transmission of measurement values measured in real time by the remote sensor.

* * * * *